(No Model.) 9 Sheets—Sheet 1.

C. G. HARRIS & J. F. McNUTT.
PRINTING MACHINE.

No. 577,405. Patented Feb. 16, 1897.

Fig. 1.

Witnesses
Inventors (No Model.) 9 Sheets—Sheet 2.

C. G. HARRIS & J. F. McNUTT.
PRINTING MACHINE.

No. 577,405. Patented Feb. 16, 1897.

Fig. 2.

(No Model.) 9 Sheets—Sheet 3.

C. G. HARRIS & J. F. McNUTT.
PRINTING MACHINE.

No. 577,405. Patented Feb. 16, 1897.

Fig. 3

Witnesses
Inventors

UNITED STATES PATENT OFFICE.

CHARLES G. HARRIS, OF NILES, AND JOHN F. McNUTT, OF WARREN, OHIO; SAID McNUTT ASSIGNOR TO SAID HARRIS.

PRINTING-MACHINE.

SPECIFICATION forming part of Letters Patent No. 577,405, dated February 16, 1897.

Application filed December 14, 1895. Serial No. 572,217. (No model.)

*To all whom it may concern:*

Be it known that we, CHARLES G. HARRIS, of Niles, and JOHN F. McNUTT, of Warren, in the county of Trumbull and State of Ohio, have invented certain new and useful Improvements in Printing-Presses; and we do hereby declare the following to be a full, clear, and exact description of the invention, such as will enable others skilled in the art to which it appertains to make and use the same.

This invention contemplates certain new and useful improvements in printing-presses, and although it has special reference to, and will be mainly described in connection with, the printing of cards or envelops yet it is not restricted in this particular, since many features of the invention are applicable to various forms or kinds of presses.

One of the many objects of this invention is to provide improved means for clamping or binding type-forms or plates on the type-carrying cylinder.

A further object is to so mount the impression-cylinder that the position thereof can be readily and easily adjusted.

A further object is to provide a simple tripping device for engaging the cards or envelops as they are fed to the press, so that in the event of any irregularity or interruption in the feed said device will trip the "stop" or "throw-off" mechanism, or both, causing the press to cease operation and the impression-cylinder to be lowered.

A further object is to provide improved stop and throw-off mechanisms.

A further object is to provide improved means for operating the ink-distributing roll.

A further object is to so mount the stops on the impression-cylinder that they will aid in discharging the cards or the like therefrom.

A further object is to provide improved guides for directing the discharge of the cards or the like, those improperly printed being deposited in a compartment separate from those properly printed.

A further object is to provide an improved feeder for feeding one card or envelop at a time from the bottom of a pile or stack of cards or envelops, and a further object is to provide a simple device for controlling the passage of the cards or envelops to the press.

The invention will be hereinafter fully set forth, and particularly pointed out in the claims.

In the accompanying drawings.

Referring to the drawings, A designates the frame of a printing-press, *a* the type-carrying cylinder, and *a'* the impression-cylinder, the journals of said cylinder being understood to be mounted and geared in the usual manner, save where any change is hereinafter indicated. The sides of the frame are horizontally divided into upper and lower sections 1 and 2, the sides of the section 1 being pivoted at their lower rear ends by rods 3, supported by ears 4 of section 2. At its front end the section 1 is held to section 2 by headed bolts 5. The inking apparatus is mounted on the upper section 1, while cylinders $a$ and $a'$ are supported by section 2. Hence access to the interior of the press can be easily had by raising and moving back section 1 without disturbing any of the inking-rolls.

Figure 1:
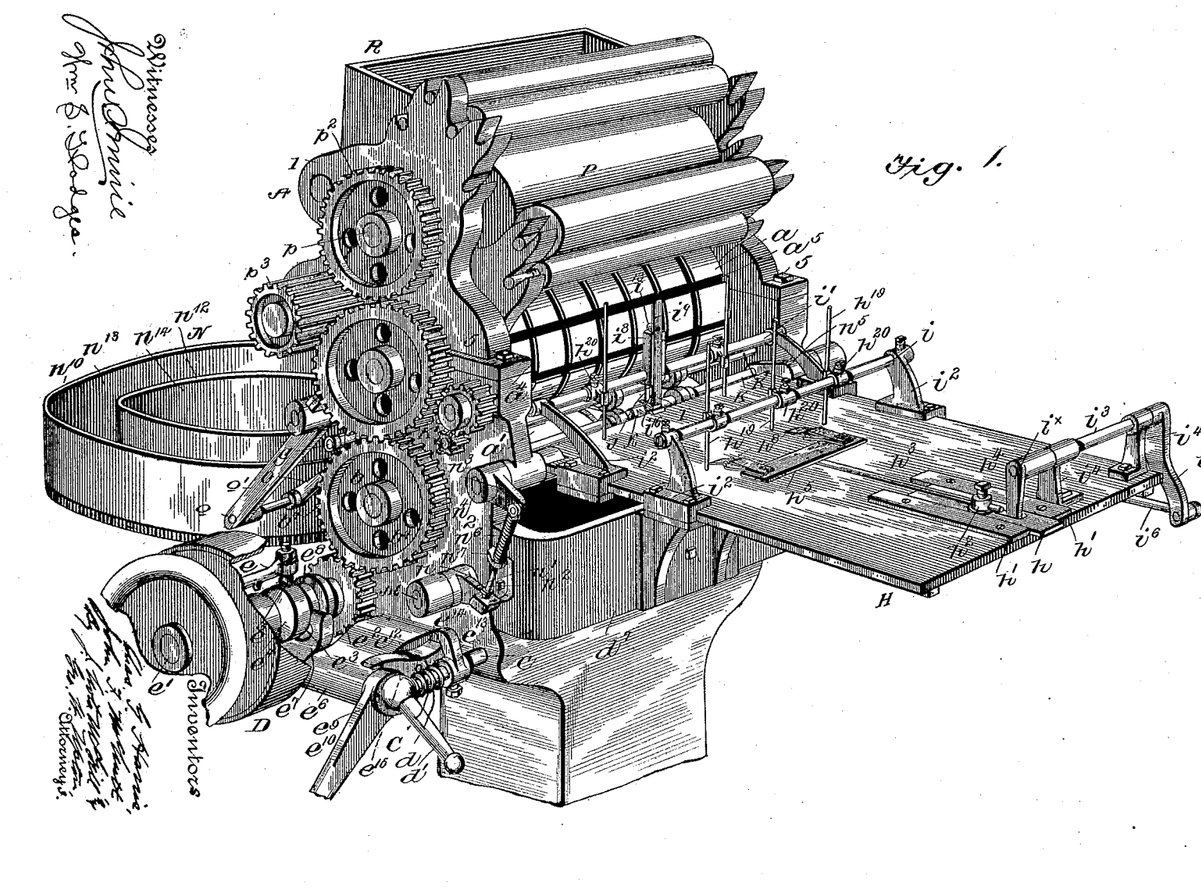
Figure 1 is a view in perspective of a printing-press constructed in accordance with our invention, parts being broken away.
Figure 2:
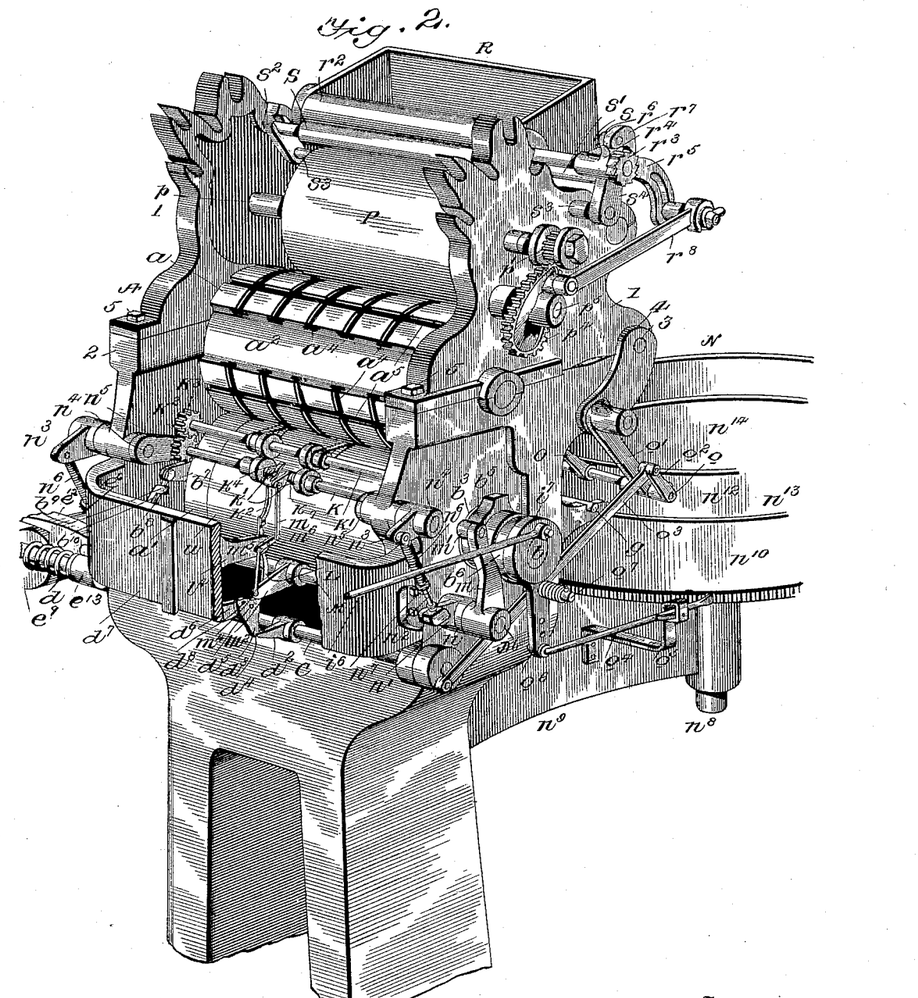
Fig. 2 is a similar view from the opposite side of the press with parts omitted and other parts broken away.
Figure 3:
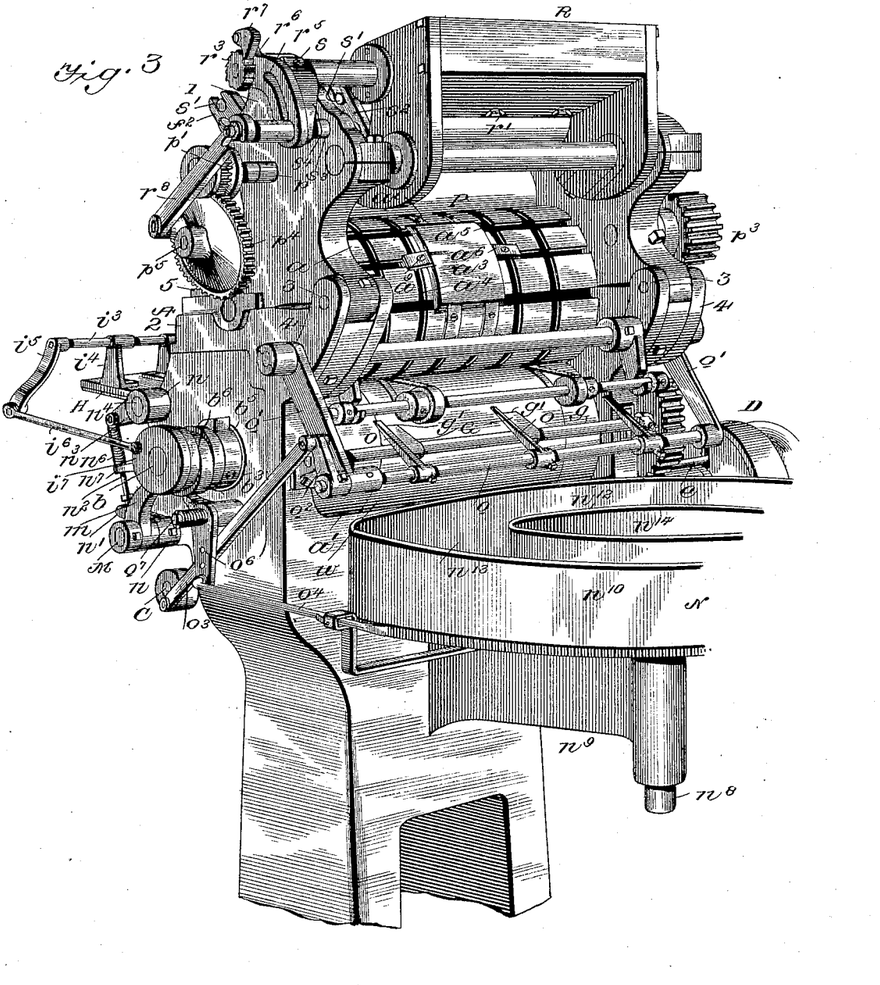
Fig. 3 is a rear view in perspective.
Figure 4:
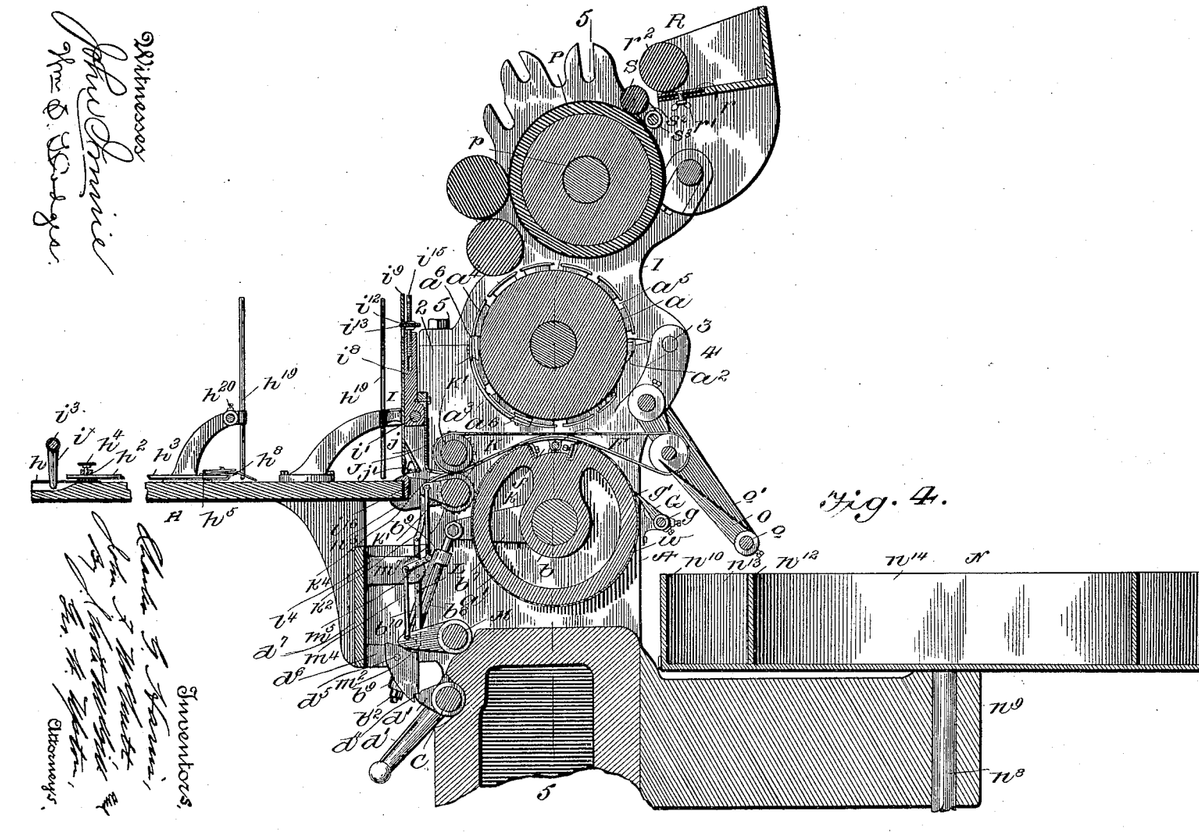
Fig. 4 is a vertical longitudinal sectional view taken at about the center of the press.
Figure 5:
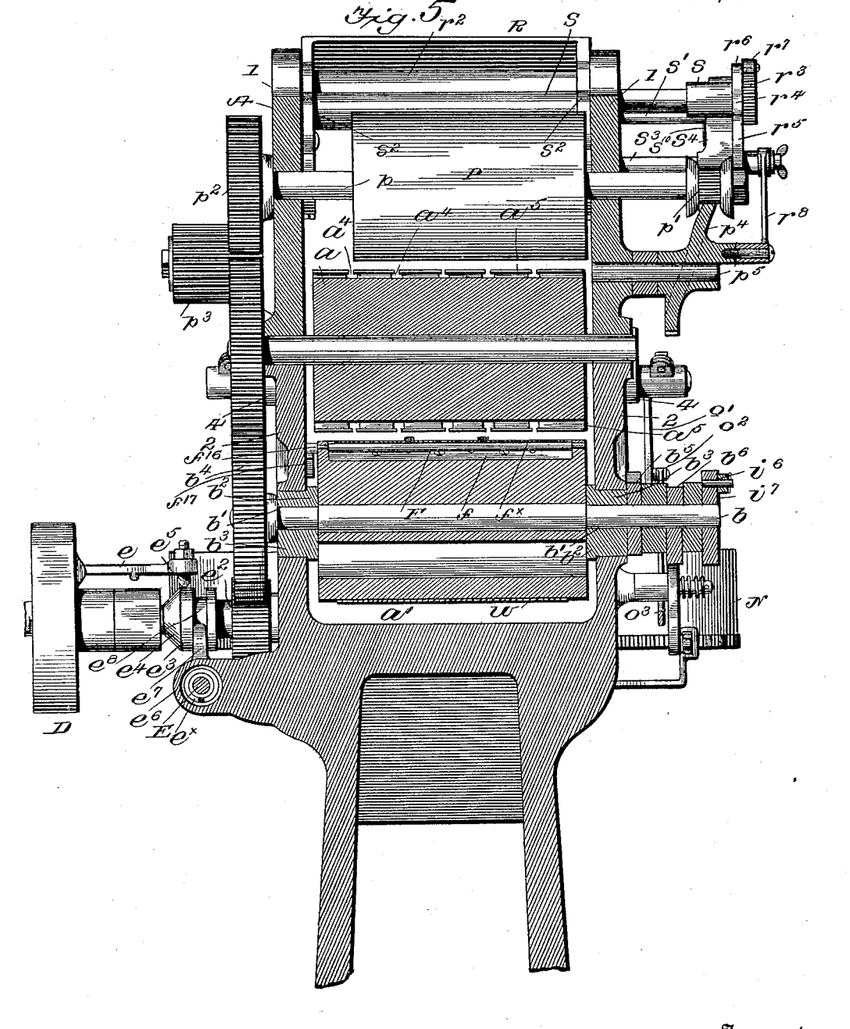
Fig. 5 is a transverse sectional view on line 5 5, Fig. 4.
Figures 6, 7, 8, 9, 10:
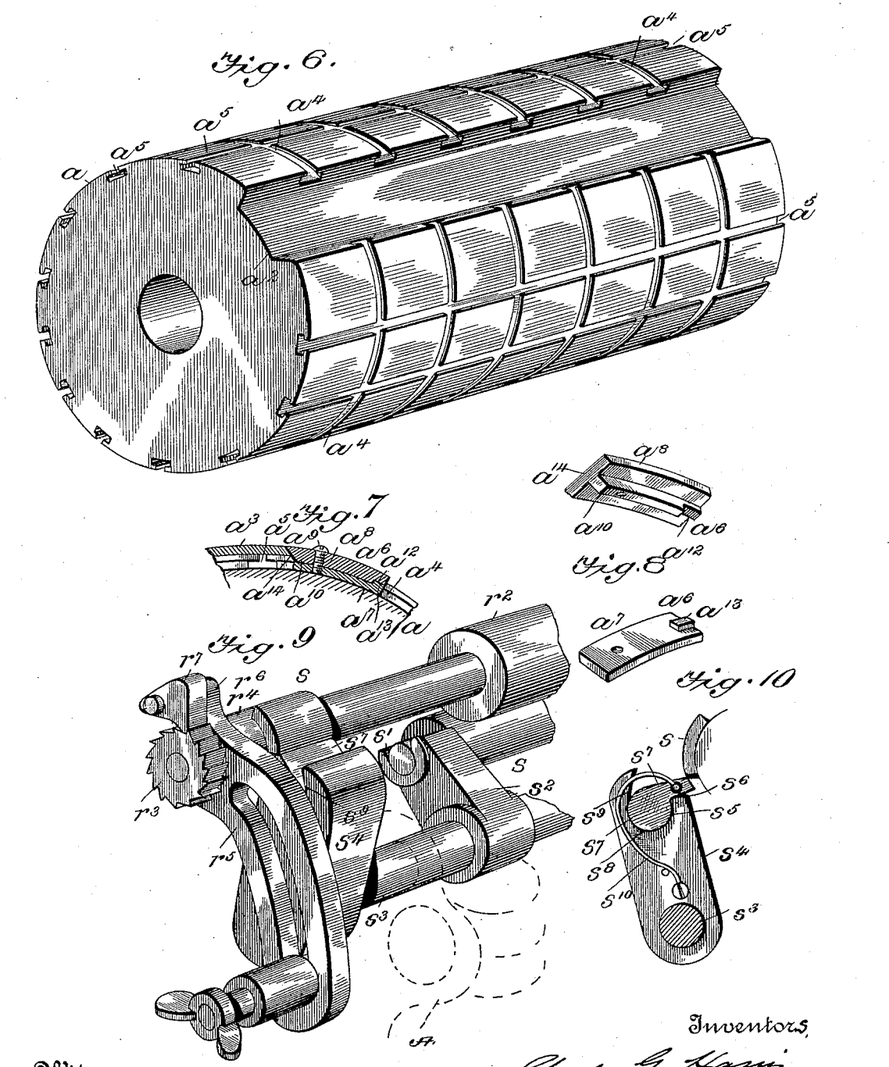
Fig. 6 is a view in perspective of the type-carrying cylinder.
Fig. 7 is a sectional detail of a portion thereof.
Fig. 8 shows one of the clamps with its parts separated.
Fig. 9 is a perspective view of the mechanism for operating the rolls of the ink-trough and adjuncts.
Fig. 10 is a detail thereof.

The type-carrying cylinder $a$ is provided with a cut-away portion $a^2$ in its periphery to permit of the insertion of clamps for binding the type-plates. At any point on this cylinder the type-plates $a^3$ may be rigidly held. In the remainder of the peripheral surface of this cylinder are two sets of T-grooves $a^4$ $a^5$, the former being circumferential and the latter running longitudinally of the cylinder. The type-plates are held by clamps $a^6$, adjustable in these grooves. Each clamp consists of an inner plate $a^7$, movable in the inner portion of the grooves $a^4$ $a^5$, and an outer plate $a^8$ of greater width, said plates being held together at one end by a binding-screw $a^9$. From the under side of the upper plate extends a longitudinal rib $a^{10}$, which fits in the outer portion of the groove, said rib having a portion removed at one end, as at $a^{12}$, to accommodate a short lug $a^{13}$ of the inner plate $a^7$.

By means of the screw $a^9$ the two plates can be drawn toward each other so as to be firmly joined to the cylinder, and the projecting ribs and lugs hold said plates as against lateral movement. The edges of the plate $a^8$ are beveled, as at $a^{14}$, to accommodate and fit snugly against the correspondingly-beveled edges of the type-plates. Any necessary number of clamps may be employed for attaching each type-plate to its cylinder. By means of the two sets of grooves clamps may be applied to all sides of the type-plates.

The impression-cylinder $a'$ has its journal $b$ passed through eccentrically-located holes $b'$ of disks $b^2$, from which latter extend hubs or circular portions $b^3$, fitted in holes in the sides of frame A. The ends of said journal $b$ are extended outward sufficiently far to accommodate at one end a gear-wheel $b^4$ and at the other end a cam or shouldered disk $b^5$ and a curved cam $b^6$. From each disk $b^2$ extends an arm $b^7$. To the outer ends of these arms $b^7$ are connected depending rods $b^8$, which are passed through upper and lower tubular portions $b^9$ of brackets $b^{10}$. The lower ends of these rods $b^8$ are threaded to receive nuts $b^{12}$. By means of these nuts the rods $b^8$ can be adjusted to control the position or horizontal plane of the impression-cylinder. This is effected by raising or lowering the outer ends of the arms $b^7$. If said arms are raised, the cylinder $a'$ is lowered, and if said arms are lowered said cylinder is raised. This is caused by the journal of the cylinder being mounted eccentrically in the disks $b^2$.

The brackets $b^{10}$ at their lower ends have short extensions $b^{13}$, which are pivoted to short arms $b^{14}$, having their hub ends fast on a shaft C, whose ends are mounted in and extended beyond the sides of the frame. A coil-spring $d$ on this shaft is constantly under tension when the cylinder $a'$ is in proper position, its office being to effect the partial rotation of said shaft, and hence the lowering of the impression-cylinder the instant any break or interruption occurs in the feeding of cards or envelops to the press. By means of a handle-bar $d'$, attached to one end of this shaft, the latter can be turned, as against the spring, winding the latter on said shaft. This shaft is held in its normal position, with its spring under tension, by a centrally-located arm $d^2$ thereon and a trip-block $d^3$, which has a shoulder $d^4$, with which the outer end of arm $d^2$ contacts. This trip-block is pivoted at $d^5$ on a lug or projection $d^6$ of a front portion $d^7$ of frame A. A pin $d^8$ limits the movement of the trip-block in one direction. The normal position of the latter is perpendicular, but if swung on its pivot, so as to disengage the central arm $d^2$, the shaft C will turn under the tension of the spring $d$. The means by which this disengagement of the trip-block and the arm of the shaft C is automatically accomplished the instant there is any break or interruption in the printing will be described in the proper place. At this point, however, it is in order to describe the stop mechanism.

Figures 22, 23, 24:
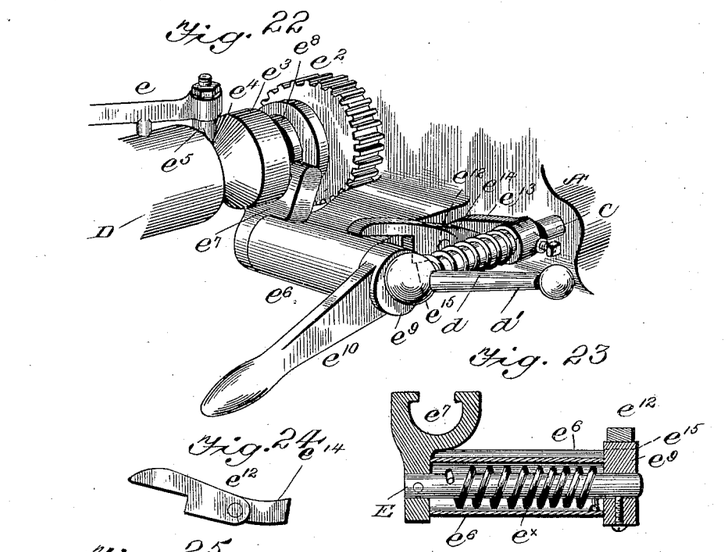
Fig. 22 is a view in perspective of the stop mechanism.
Fig. 23 is a longitudinal sectional view thereof.
Fig. 24 is a detail.

D is a clutch-pulley, of any preferred form, having a clutch-controlling arm $e$, which, when its outer end is moved outward or away from the shaft, will cause the pulley and its shaft to revolve together, and when moved inward at that end will disengage said shaft and pulley. It is mounted on the main operating-shaft $e'$, whereon is a gear-wheel $e^2$, which meshes with the gear-wheel $b^4$ of the impression-cylinder. On this shaft $e'$ is a sliding collar $e^3$, having a beveled or cone-like end $e^4$. A pin $e^5$ of arm $e$ engages this collar, and when in contact with the cylindrical portion of the latter the shaft and clutch-wheel revolve together, but when said collar is moved so that the pin engages the beveled or cone end thereof said arm is moved toward the shaft, disconnecting the clutch-sections, thus allowing the rim or outer portion of the clutch-wheel to revolve independently of the shaft. A shaft E, mounted in a boxing $e^6$ of frame A, has at one end a fork $e^7$, the inturned ends of which fit in a circumferential groove $e^8$ of collar $e^3$. A coil-spring $e^\times$ surrounds this shaft within the boxing $e^6$ and its tendency is to hold the clutch out of operation. On the other end of this shaft is fastened the hub end $e^9$ of an arm $e^{10}$. When this arm is lowered and the shaft E turned so as to throw the cylindrical end of the collar beneath the pin of the clutch-arm, it is so held locked by an arm $e^{12}$, pivoted to the boxing $e^6$. An arm $e^{13}$, fast on shaft C, is at right angles to this retaining-arm $e^{12}$ and is normally held elevated; but the instant the shaft C is turned, under the tension of its spring, the arm $e^{13}$ flies downward, and striking a shoulder $e^{14}$ of arm $e^{12}$ in rear of the pivot of the latter said latter arm will be raised from engagement with a shoulder $e^{15}$ of the hub $e^9$, permitting the shaft E to partially rotate under the tension of its spring $e^\times$, resulting in the forked end of said shaft moving the sliding collar on the operating-shaft, the clutch being disengaged from said shaft. The reëngagement is effected by lowering the arm $e^{10}$ after the handle-bar $d'$ has been lowered to effect the return of the impression-cylinder to its normal position and the reëngagement of the arm $d^2$ with the trip-block.

Figure 11:
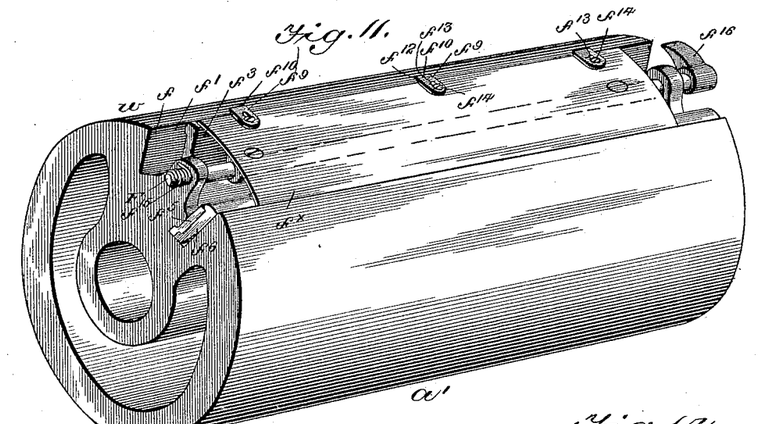
Fig. 11 is a view in perspective of the impression-cylinder.
Figure 12:
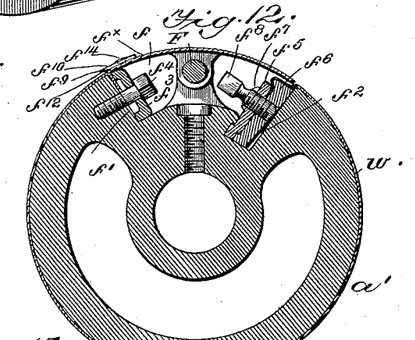
Fig. 12 is a transverse sectional view thereof.
Figure 13:
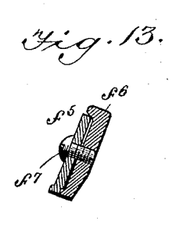
Fig. 13 is a sectional view of one set of clamp-plates.

In the periphery of the impression-cylinder $a'$ is a longitudinal groove or cut-out $f$, having opposite inclined walls $f'$ $f^2$. To the wall $f'$ is secured a clamping-plate $f^3$ by means of screws $f^4$. This clamping-plate is designed to firmly hold one end of the covering or blanket-sheet $w$, which encompasses the cylinder. It is preferably formed in three sections to permit of the removal of portions thereof, so that a small part of the covering or blanket-sheet may be cut out and be replaced without disturbing the remainder. The other end of the covering or blanket-sheet is held between two continuous clamp-plates $f^5$ $f^6$, which are firmly drawn together by screws $f^7$. Through coincident threaded openings in these clamp-plates are passed adjusting-bolts $f^8$, the inner ends of which contact with the inclined wall $f^2$. The lower edges of the clamping-plates are held so as not to be moved bodily away from or toward the adjacent wall of the cut-out, and hence it will be seen that by turning these bolts $f^8$ the upper edges of the clamp-plates can be moved away from the wall $f^2$, thus tightening the covering $w$. In this way we have provided simple and efficient means for attaching and stretching the covering of the impression-cylinder.

Figure 14:
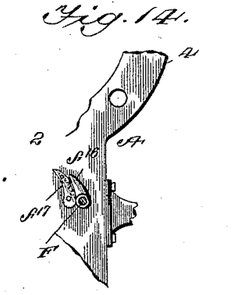
Fig. 14 is an inner view of a portion of one side of the press-frame, showing the means for tilting the stops of the impression-cylinder.
Figure 15:
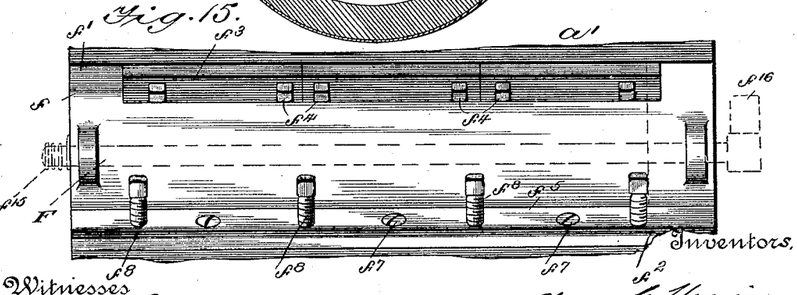
Fig. 15 is a plan view of the latter cylinder with the stops and their supporting-plate removed.

F designates a shaft centrally located in the groove or cut-out $f$, and to one edge of a slightly-curved plate $f^\times$ thereon the stops $f^9$ of the impression-cylinder are adjustably attached. These stops preferably consist of plates $f^{10}$, having shouldered or beveled ends $f^{12}$ and slots $f^{13}$, through which screws $f^{14}$ are passed. A spring $f^{15}$ on this shaft normally holds the stop-plates against the periphery of the cylinder. The plate $f^\times$ substantially covers the groove or cut-out $f$ and the stops rest on the cylinder. On one end of this shaft F is an arm $f^{16}$, which engages a shoulder $f^{17}$ on the adjacent side of frame A, so as to partly rock said shaft and permit of the disengagement of the stops with the card or envelop at the point of discharge, this movement of the stops aiding in discharging said cards or envelops from the cylinder.

G G designate two blocks adjustably mounted on a shaft $g$, supported by the sides of the frame. These blocks are inclined or of wedge-like form, so that their reduced edges $g'$ will be in close proximity to the periphery of the cylinder. The card or envelop after being printed contacts with these blocks as the stops $f^9$ are partly elevated, said blocks effecting the discharge of and guiding said cards in passing from the press.

H is the feed-table, upon which a pile or stack of cards or envelops is located ready to be fed to the press, the feeding being effected from the bottom of said stack or pile. Any preferred form of feeder may be employed, the object being to feed but one card or envelop at a time.

Figures 16, 17, 18, 19, 20, 21, 28:
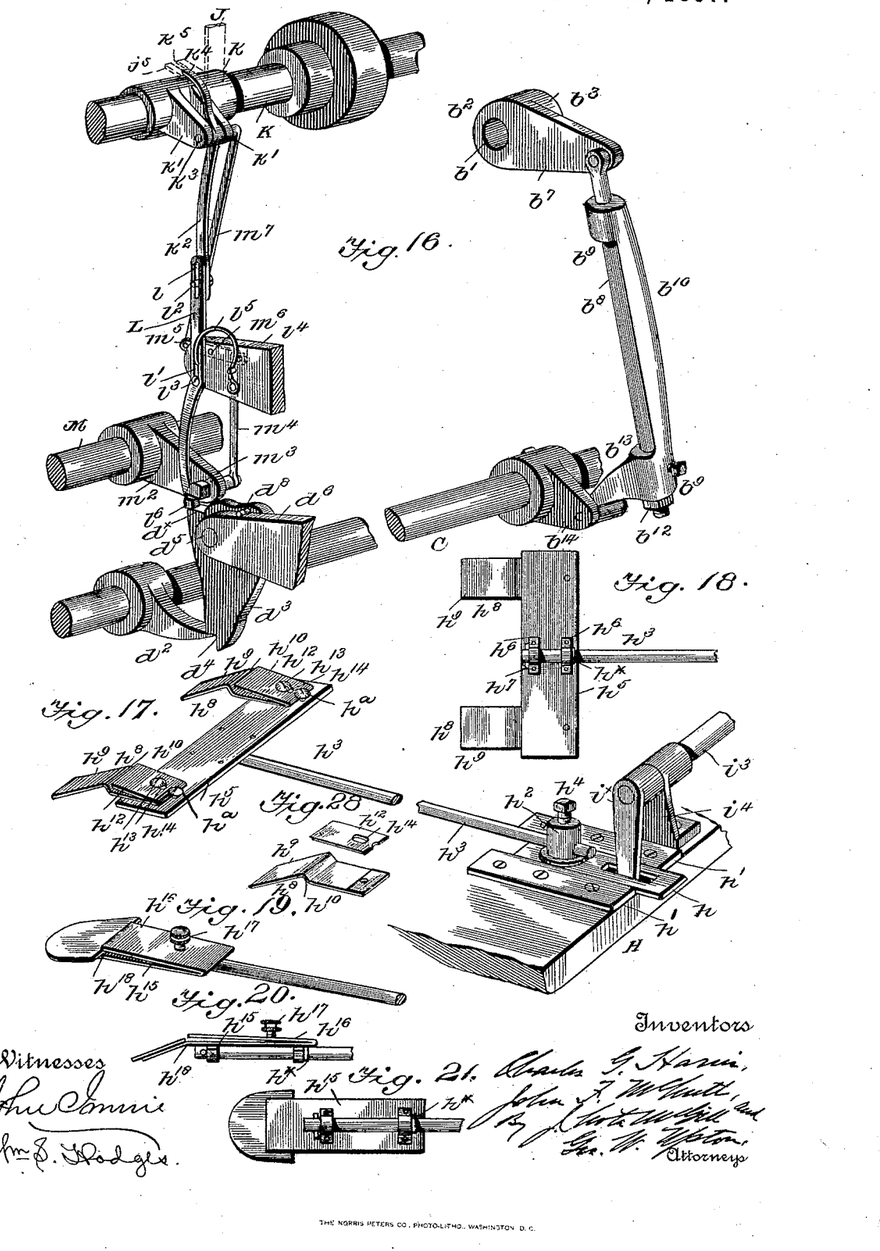
Fig. 16 is a view in perspective of the tripping device.
Fig. 17 is a similar view of the preferred form of feeder.
Fig. 18 is a bottom plan view thereof.
Fig. 19 is a view in perspective of a slightly-modified form of feeder.
Figs. 20 and 21 are respectively side and bottom plan views thereof.
Fig. 28 is a detached perspective view of portions of the feeder.

The feeder shown comprises a longitudinally-movable bar $h$, fitted between guide-plates $h'$ and having a threaded lug or post $h^2$, through an opening in which is passed a rod $h^3$, which is firmly bound at the desired point by a screw $h^4$, working in a vertical hole in post $h^2$. Upon the outer end of this rod $h^3$ is loosely mounted a plate $h^5$, having eye-loops $h^6$, through which the rod is passed. A pin $h^7$ limits the rocking movement of the plate $h^5$ in either direction, and said pin and a flange $h^\times$ on said rod prevent plate $h^5$ moving longitudinally on rod $h^3$. From this plate $h^5$ project, or they may be formed integral therewith, shouldered plates $h^8$, having inclined ends $h^9$. Against the top or inclined portions of the shoulders $h^{10}$ of these plates are designed to bear the free ends of longitudinally-adjustable plates $h^{12}$, held by screws $h^{13}$, passed through slots $h^{14}$. The adjustment is effected by the beveled heads of screws $h^a$ engaging the ends of the plates, the screws $h^{13}$ serving to securely hold the plates after being adjusted. The ends of these plates are designed to engage and shove forward the cards or envelops one at a time, and the extent of projection of the ends of these plates above the shoulders is regulated by the longitudinal adjustment thereof. According to the thickness of the cards or envelops the ends of the plates $h^{12}$ are caused to project a greater or lesser degree above the shoulders $h^{10}$. It frequently occurs that packages of envelops are bent or twisted and will not rest flat on the feed-table, but by loosely mounting the plate $h^5$ the feeder is free to conform to such irregularity and thus insure contact with the envelops. A slight modification of the feeder is shown in Figs. 19 to 21. But one plate $h^{15}$ is mounted on the rod, and to it is secured, or it may be formed integral therewith, one end of a plate $h^{16}$. A screw $h^{17}$ regulates the extent to which the free end of this plate $h^{16}$ is raised above or lowered below the shoulder $h^{18}$. The pile of cards, &c., is held in proper position by upright rods $h^{19}$, held by collars $h^{20}$, adjustable on two cross-rods $i$ $i'$, extended over the table and mounted at their ends in posts $i^2$. The feeder-bar $h$ is given a reciprocating movement by any suitable means, but preferably by a shaft $i^3$, mounted in posts $i^4$ and having a depending arm $i^\times$ fitting in a slot in said feeder-bar. To an arm $i^5$ on the outer end of this shaft is connected one end of a pitman $i^6$, the other end of which is connected to a disk $i^7$ on the journal of the impression-cylinder.

Figures 25, 26, 27:
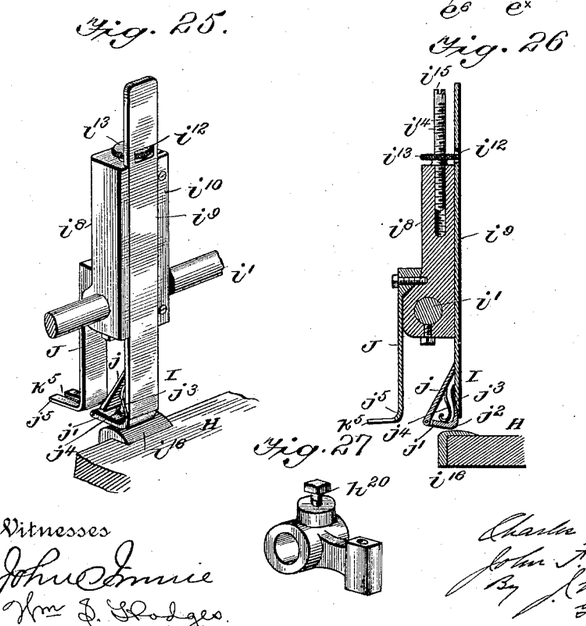
Fig. 25 is a view in perspective of the feed-regulator.
Fig. 26 is a vertical sectional view thereof.
Fig. 27 is a detail.

I is the regulator for controlling the passage of cards, &c., to the press, it being located at the inner or forward end of the feed-table in the line of passage. Mounted on the cross-rod $i'$, at or near the center thereof, is a post $i^8$, in the front grooved face of which is fitted a vertically-adjustable bar $i^9$, which is held in place by a removable strip $i^{10}$. In this bar $i^9$ is an opening $i^{12}$, in which fits a horizontal disk or wheel $i^{13}$, fast on an adjustable rod $i^{14}$, which works in a threaded opening in the post $i^8$. By inserting any suitable tool in the grooved end $i^{15}$ of this rod the latter may be turned to control the height of the bar $i^9$, the lower end of which latter is movable within a short distance of a beveled block or raised surface $i^{16}$ of the feed-table. To the rear side of the bar $i^9$ is secured a rearwardly and downwardly extended arm $j$, to the free end of which is pivoted the rear end of the approximately horizontal portion $j'$ of a tongue $j^2$, the forward portion $j^3$ of which is slightly curved backward and extended up in rear of the bar $i^9$. This tongue has but a limited movement by reason of contact with the bar $i^9$ and arm $j$. A spring $j^4$ serves to normally hold this tongue in its lowered position, that is, almost in contact with the block $i^{16}$. The bar $i^9$ being properly adjusted, the tongue $j^2$ will give sufficiently to allow but one card or envelop at a time to pass to the press. The tongue is free to move sufficiently far to allow for the increased thicknesses at certain points in an envelop, and being usually made of metal is not affected by constant use and is positive in its operation. By means of the adjusting-screw the bar and tongue can be easily adjusted to a nicety, completely controlling the passage to the press. To the rear face of the post $i^8$ is connected the upper end of a finger J, the lower forked end $j^5$ of which is slightly curved and extended rearward on a line with the lower end of the feed-controller.

K is one of the feed-shafts for carrying the cards, &c., forward and giving an accelerated movement to them as they are fed to the press, the same having peripheral enlargements, which are designed to be thrown into contact with similar enlargements of an upper shaft K' by a slight rocking of said shaft K. In this way, in connection with the ordinary tapes of the press, the cards, &c., are carried to the stops $f^9$ of the impression-cylinder at a speed faster than the face speed of said cylinder. This shaft K extends across the frame, and its normal position is on a plane slightly below the lower end of the forked finger J and the line of passage to the press. At one end it is provided with a pinion $K^2$, which meshes with a similar pinion $K^3$ on shaft K', so as to cause them to revolve in unison, the journal of the shaft K' being driven by the gearing mechanism on one side of the frame. The teeth of these pinions are sufficiently deep to prevent disengagement when the shaft K is lowered, which latter is but a small fraction of an inch.

Upon shaft K, at a point beneath the forked finger and between the peripheral enlargements, is a loosely-mounted sleeve $k$, from which extend two parallel ears $k'$, between which is pivotally mounted a lever $k^2$ by means of a short rod $k^3$. The upper short arm $k^4$ of this lever is slightly curved and extended rearward over shaft K and in line with the space or opening $k^5$ in the end of the finger J. To the lower end of the long arm of this lever is articulated the upper end of a sliding lever L, having at said end and its center slots $l$ and $l'$. In the former projects a stud $l^2$ on the lower end of lever $k^2$, while through the slot $l'$ is passed the fulcrum-screw $l^3$, which holds the lever L to a lug or projection $l^4$ of the frame A, the same being above the lug or projection $d^6$. A spring $l^5$ serves to hold the lever L in its uppermost position. On one side of the lower end of this lever is a lug $l^6$, which is normally directly over a shoulder $d^\times$ of the trip-block $d^3$. Hence a straight downward movement of lever L will result in the disengagement of the trip-block $d^3$ from the arm $d^2$.

M is a rock-shaft extended longitudinally through the frame A, parallel with and between the shafts C and K. On one end of this shaft M is keyed an arm $m$, carrying a roller $m'$ at its upper free end, which is designed to be engaged by the cam or shouldered disk $b^5$, whereby said shaft is periodically partially rotated. At about the center of this shaft is keyed an arm $m^2$, from one side of which projects a lug $m^3$, between which and the shoulder $d^\times$ of the trip-block sufficient space is left to permit the lug $l^6$ of lever L to move out and back when said lever and the lever $k^2$ are swung on their fulcra. To a lug on the other side of the outer end of this arm $m^2$ is connected the lower end of a rod or pitman $m^4$, which at its upper end is connected to a pivoted rocking arm $m^5$, centrally fulcrumed at $m^6$ on the frame lug or projection $l^4$, and to the other end of this arm $m^5$ is connected the lower end of a second rod or pitman $m^7$, which at its upper end is connected to the pivot-rod $k^3$. In practice the rocking of the shaft M will cause the arm $m^2$ to move downward, pulling on the rod $m^4$, which through rocking arm $m^5$ will raise rod $m^7$, resulting in the upward movement of the ears $k'$ as the sleeve $k$ is moved on shaft K. This movement of the parts occurs at the point when a card or envelop is or should be passing beneath the forked finger J. If such card or envelop is in position, the arm $k^4$ of lever $k^2$ will contact therewith and be lowered, resulting in said lever turning on its fulcrum $k^3$, and its lower end will throw the upper end of lever L outward, the lower end thereof being swung inward, carrying its lug $l^6$ out of the way of the lug $m^3$, which travels to within a short distance of, but does not contact with, the shoulder $d^\times$ of the trip-block. In this way the latter is not disturbed so long as the cards, &c., are being properly fed to the press, and as the arm $m^2$ is raised by the return movement of the shaft M the sleeve $k$ resumes its normal position, as do also the levers $k^2$ and L, under the action of the spring $l^5$. If, on the other hand, a card or envelop should not be fed or properly positioned when the shaft M is partly rotated, the arm $k^4$ of the lever $k^2$ will move upward through the slot or opening $k^5$ in the forked finger J, and failing to be turned on its pivot, as before described, the lever L will retain its usual vertical position, and the lug $m^3$ of arm $m^2$, striking against the lug $l^6$ of lever L, will force the latter downward against the shoulder $d^x$ of the trip-block, causing the latter to turn on its pivot and free the arm $d^2$ of shaft C, permitting the latter to turn under the action of its spring, resulting in the lowering of the impression-cylinder and the unclutching of the clutch-pulley, all as above fully set forth. The lever L being slotted at its fulcrum is free to move downward a slight extent when depressed by arm $m^2$, but as soon as this arm is raised the levers $k^2$ and L will assume their normal positions. On the projecting ends of rock-shaft M, adjacent the sides of the frame, are keyed the hubs $n\,n$ of arms $n'$, to which are connected the lower ends of two spring-held rods $n^2$, the upper ends of which are pivoted to arms $n^3$ on the outer ends of short shafts $n^4$, mounted in bearings in the sides of the frame. On the inner ends of these latter shafts are short arms $n^5$, which form the bearings for the shaft K, by which the latter is slightly raised and lowered. The springs $n^6$, encircling rods $n^2$, bear at their lower ends against apertured lugs $n^7$, extending from frame A and through holes in which said rods are passed. By the means described the free end of arm $m$ is constantly held in contact with the cam or shouldered disk $b^5$ and the shaft K is normally held lowered. These springs also serve to return the shaft M to its normal position as soon as arm $m$ is free of the shoulder on cam $b^5$.

N designates a receptacle for receiving the cards or envelops as discharged from the press. It is of circular form and has a central depending shaft $n^8$, mounted in an outwardly-extended arm $n^9$ of the press-frame. Concentric with the outer rim $n^{10}$ of this receptacle is an inner circular rim $n^{12}$, near the center thereof, thus forming two compartments $n^{13}$ and $n^{14}$, the former receiving all properly-printed cards, &c., while those not so printed are deposited in the latter. The cards, &c., engaging the blocks G, are caused to fall into the compartment $n^{13}$ of the receptacle, but when any interruption or mistake occurs and the impression-cylinder is shifted at the same instant tapered arms O are thrown down against shaft $g$, their free ends extending over to the impression-cylinder beyond the blocks G. The card or envelop striking against any one of said arms will slide thereover and be deposited in the central compartment $n^{14}$ of the receptacle. These arms O are mounted on a shaft $o$, loosely held by depending supports $o'$, and having at one end an arm $o^2$, to which a pitman $o^3$ is connected, the other end of said pitman being eccentrically connected to one end of shaft C. In this way as said shaft is permitted to partly rotate when tripped to effect the operation of the stop and throw-off mechanisms the arms O are lowered, so as to direct the discharge of the card or envelop not properly printed. This receptacle is slowly rotated on its pivot-arm by a spring-pressed rod or pawl $o^4$, passed through a bracket $o^5$, supported by arm $n^9$. This rod or pawl is connected to the lower end of a lever $o^6$, fulcrumed at $o^7$ to frame A, the free end being engaged by cam $b^6$ on the journal of cylinder $a'$.

P is the inking-cylinder designed to engage the form-rolls which ink the type-plates of the cylinder $a$ and effect the thorough inking thereof. The length of this cylinder is not so great as the space betwen the sides of the frame, the object being to permit said cylinder to travel back and forth between said sides to the limit of its movement at the same time that it is being revolved in contact with the form-rolls. The journal $p$ of this cylinder is extended through the sides of the frame and on one end is provided with a small toothed wheel $p'$, while on its other end is a gear-wheel $p^2$, which meshes with and derives its motion from a wide gear-wheel $p^3$. This latter wheel is thus made so that the engagement therewith of the wheel $p^2$ will be constantly maintained notwithstanding the longitudinal movement of the ink-cylinder and its journal. With the toothed wheel $p'$ engages the toothed periphery of an irregularly-bent or cam-like wheel $p^4$, mounted on a stud $p^5$, extended from one side of the frame. As the cylinder is rotated the wheel $p'$ on the journal $p$ thereof, engaging with the irregular wheel $p^4$, is moved back and forth longitudinally, thus thoroughly distributing the ink over the form-rolls.

R is the ink-trough, over whose bottom is a plate $r$, rendered adjustable by screws $r'$, working in holes in said bottom. Over the outlet end of this trough is located a fountain-roll $r^2$, and on one end of the journal thereof is a ratchet-wheel $r^3$, adjacent to which is a loose collar $r^4$, from which depends a slotted arm $r^5$. To an upper projection $r^6$ of this arm is pivoted a pawl $r^7$, which by gravity is constantly held in engagement with the ratchet-wheel $r^3$. To the slotted arm $r^5$ is connected one end of a pitman $r^8$, the other end of which is mounted eccentrically on the wheel $p^4$, the revolution of which will swing arm $r^5$, causing the pawl $r^7$ through the ratchet-wheel to turn the roll $r^2$. On the collar $r^4$ is a flat or beveled shoulder $s$.

S is a second or distributing ink-roller, whose journal $s'$ is supported in the grooved ends of arms $s^2$, mounted on a transverse shaft $s^3$, supported in the sides of the frame, and upon one end of this shaft is keyed an arm $s^4$. The upper end of this arm is provided with a rounded recess $s^5$ and a shoulder $s^6$. In this recess is located a block $s^7$, having a rounded portion $s^8$ and a flat portion $s^9$, whose outer end is beveled. A spring $s^{10}$ serves to normally hold this block $s^7$ in contact with shoulder $s^6$, as shown in Fig. 10. As the collar $r^4$ is rotated simultaneously with the roll $r^2$ (which carries out a fresh supply of ink) by the forward movement of arm $r^5$ the shoulder $s$ engages the end of the block $s^7$ and forces arm $s^4$ outward, and through shaft $s^3$ arms $s^2$ will throw ink-roll S up to contact with the freshly-inked surface of fountain-roll $r^2$. In the return movement of arm $r^5$ the friction of the edge of block $s^7$ against shoulder $s$ is sufficient to overcome the spring $s^{10}$, causing said block to be lifted and allowing arm $s^4$ to return to its normal position at the start of the return movement of shoulder $s$. Thus the fountain-roll $r^2$ is at once dropped into contact with the ink-cylinder and allowed to so remain during the time the collar is on its return movement and until the shoulder $s$ again engages the block.

While we have shown and described our improvements in connection with presses for printing cards and envelops, yet it will be understood that we do not restrict ourselves in this particular, since many features are applicable to other presses, including those from which the printing is on paper supplied from webs or continuous rolls.

Changes may be made in the details of construction without departing from the scope of the invention.

By the term "tripping device" we mean mechanically-operated means which will be intermittently operated and have a movable member designed to be thrown across the line of passage of the article to be printed, and upon engagement therewith so act on its adjuncts as not to disturb the operation of the press, but in the event of not contacting with such article, or the latter is not properly positioned, aid in unseating some movable member, allowing the impression-cylinder to be shifted or causing the press to cease operation, or both. While we have specified the throw-off mechanism as being capable of lowering the impression-cylinder in the event of any irregularity in the feed to the press, yet we mean to include any shifting of said cylinder which will throw it out of operation. It will also be noted that the stop mechanism is described as embracing a clutch-pulley, but it is obvious that the same means may be employed, with possibly slight additions, for shifting a belt from a fast to a loose pulley.

We claim as our invention—

1. In a printing-press, having its type-carrying cylinder formed with a longitudinal peripheral cut-out and a series of circumferential and longitudinal T-grooves, a series of clamps consisting each of an inner slightly-curved plate having a lug on its outer surface adjacent to one end, an outer plate also slightly curved and beveled at one end and provided on its under side with a rib and formed with a recess at one end to accommodate said lug, and a binding-screw at the other end for uniting said plates, substantially as set forth.

2. In a printing-press, the combination with an impression-cylinder and eccentric bearings therefor, of means tending to normally turn said bearings so as to move the impression-cylinder away from the type-carrying cylinder, said means comprising a spring-impelled shaft to which said bearings are connected, a trip for normally restraining said shaft and devices intermittently operated and adapted to actuate the trip in the event of any irregularity in the feed to the press, substantially as set forth.

3. In a printing-press, the combination with an impression-cylinder and eccentric bearings therefor, of means tending to normally turn said bearings so as to move the impression-cylinder away from the type-carrying cylinder, a trip for normally restraining said means, an intermittently-operated shaft having an arm or projection movable in line with said trip but not engaging therewith, and a lug, or the like, normally filling the space between said trip and said arm or projection, and a device designed to move said lug out of its normal position only in the event of the stock being properly fed, whereby if said lug is not so moved said arm or projection will free said trip, substantially as set forth.

4. In a printing-press having throw-off and stop mechanism, a spring-impelled shaft designed to effect the operation thereof, a trip-block for normally holding said shaft, a second shaft intermittently operated having an arm or projection movable in line with said trip-block, and a device capable of being raised and lowered by said second shaft having a swinging portion the upper end of which is designed to engage or contact with the card, envelop or paper being fed to the press, its other end being designed to swing into and out of, the line between said arm or projection and said trip-block, substantially as set forth.

5. In a printing-press having its impression-cylinder eccentrically mounted, a rock-shaft connected thereto, a trip for holding said shaft stationary in its normal position, and a mechanical device operated by the rotation of said cylinder and designed to disengage said trip and allow said shaft to rotate in the event of any irregularity in the feed to the press, as and for the purpose set forth.

6. The combination with a press having its impression-cylinder provided with eccentric bearings, of the rock-shaft, connections between said shaft and said bearings, a trip for holding said shaft in its normal position, a second rock-shaft operated by the rotation of said cylinder, and a device operated by said latter shaft and designed to disengage said trip in the event of any irregularity in the feed to the press, as set forth.

7. The combination with a press having its impression-cylinder provided with eccentric bearings having arms, of the rock-shaft, connections between said shaft and said arms, an arm on said rock-shaft, a trip for engaging said arm, a second rock-shaft operated by the rotation of said cylinder having an arm, and a device having a swinging member movable between said arm and said trip and designed to effect the tripping of the latter in the event of any interruption in the feed to the press, as set forth.

8. The combination with a printing-press having a shiftable impression-cylinder, of a device intermittently operated by the rotation of said cylinder and having a pivoted member designed to be arrested in its movement by contact with the card, or the like, passing to said cylinder, and means designed to be operated by said device to effect the shifting of said cylinder in the event of said pivoted member not being so arrested by such card, or the like, as set forth.

9. The combination with a printing-press having a shiftable impression-cylinder, of an intermittently-operated device designed to engage the card or the like in its passage to said cylinder, a shaft for shifting said cylinder, and a rock-shaft for moving said device and designed to operate said former shaft through the agency of said device in the event of any irregularity in the feed to the press, as set forth.

10. The combination with a printing-press having a shiftable impression-cylinder, a shaft for shifting said cylinder, and a trip-block for holding said shaft, of a mechanically-operated device designed to engage the card or the like in its passage to said cylinder, and a rock-shaft for operating said device and designed to effect the tripping of said block in the event of any irregularity in the feed to the press, as set forth.

11. The combination with a printing-press having its impression-cylinder mounted in eccentric bearings, of a spring-impelled shaft, connections between said shaft and said bearings, a trip-block for holding said shaft, a rock-shaft, and a device operated by said latter shaft and having a movable portion designed to be forced by said rock-shaft into engagement with said trip-block in the event of any irregularity in the feed to the press, as set forth.

12. The combination with a press having its impression-cylinder mounted in eccentric bearings, of a spring-impelled shaft having an arm, connections between said shaft and said bearings, a trip-block for engaging and holding said arm, a rock-shaft operated by said cylinder having an arm provided with a lug, and a device operated by said rock-shaft designed to engage the card or the like in its passage to said cylinder and having a swinging member provided with a lug which is forced by said lug of said arm into engagement with said trip-block in the event of any irregularity in the feed to the press, as set forth.

13. The combination with a press having its impression-cylinder mounted in eccentric bearings, of a spring-impelled shaft having an arm, connections between said shaft and said bearings, a trip-block for engaging and holding said arm, a rock-shaft operated by said cylinder having an arm provided with a lug, a second shaft, a sleeve thereon, a lever fulcrumed on said sleeve and having an arm designed to engage the card or the like in its passage to said cylinder, a second lever connected to said former lever and having a lug designed to be engaged by said lug of said arm in the event of any interruption in the feed to the press, and connections between said rock-shaft and said sleeve for effecting the operation of said levers, substantially as set forth.

14. The combination with a press having its impression-cylinder mounted in eccentric bearings, of a spring-impelled shaft having an arm, and connections between said shaft and said bearings, a trip-block for engaging and holding said arm, a rock-shaft operated by said cylinder having an arm provided with a lug, a second shaft, a sleeve thereon, a lever fulcrumed on said sleeve and having an arm designed to engage the card or the like in its passage to said cylinder, a second lever connected to said former lever and having a lug designed to be engaged by said lug of said arm in the event of any interruption in the feed to the press, and pivoted rods or pitmen connecting said arm of said rock-shaft to said sleeve, substantially as set forth.

15. In a printing-press having mechanism for stopping the operation thereof, a tripping device comprising an intermittently-operated lever which is arrested in its movement by contact with the article to be printed, and a second lever engaged by said former lever and designed to be moved thereby when said former lever engages said article so as not to operate the stop mechanism and to aid in operating the latter in the event of the movement of said former lever not being arrested by the article to be printed, as set forth.

16. In a printing-press having mechanism for stopping the operation thereof, a tripping device comprising an intermittently-operated lever one arm of which is designed to engage the article to be printed, a movable support for said lever, means for moving said support, and a second lever connected to said former lever and designed to be moved thereby when said former lever engages said article, and to aid in operating said stopping mechanism in the event of any irregularity in the feed to the press, as set forth.

17. In a printing-press, the combination with a rotary shaft, an intermittently-operated rock-shaft, a spring-impelled shaft for controlling the position of the operative parts of the machine, and a trip-block for holding said latter shaft, of a lever, a sleeve loose on said rotary shaft having ears, said lever being fulcrumed between said ears, a second lever depending from said former lever and having a lug normally in line with said trip-block, an arm on said rock-shaft designed to engage said lug when the latter is in alinement therewith, and connections between said arm and said sleeve for raising and lowering the latter, whereby an arm of said first-mentioned lever is intermittently raised so as to engage the article to be printed, substantially as set forth.

18. In a printing-press, the tripping device herein described, consisting of a lever, the sleeve supporting the same, the support for said sleeve, a second lever having a lug, the rock-shaft having an arm, the pivoted arm, the rods or pitmen connecting the same to said arm and said sleeve, the spring-impelled shaft having an arm, and the trip-block holding the same, all constructed and designed to operate as set forth.

19. The combination with a printing-press having stop mechanism, of a spring-impelled shaft for operating the same, a trip for normally holding said shaft, and an intermittently-operated mechanical device having a pivoted member designed to be arrested in its movement by contact with the card or the like passing to the press and to operate said trip and allow said shaft to rotate in the event of said pivoted member not being so arrested in its movement, as set forth.

20. The combination with a press having its impression-cylinder eccentrically mounted, a rock-shaft connected with said cylinder, and an operating-shaft having a belt-pulley thereon, of a device for controlling said belt-pulley designed to be operated by said rock-shaft, and an intermittently-operated mechanical device designed to be arrested in its movement by contact with the card or the like passing to the press and to effect the operation of said rock-shaft in the event of not being so arrested in its movement, as set forth.

21. The combination with a press having its impression-cylinder eccentrically mounted, a rock-shaft connected with said cylinder for shifting the position thereof, and an operating-shaft having a clutch-pulley thereon provided with an operating-arm, of a device for controlling said clutch-pulley, comprising a movable member engaging said operating-arm, a shaft engaging said member at one end, a lock thereon, and means connected to said rock-shaft for disengaging said lock, as and for the purpose set forth.

22. The combination with a press having its impression-cylinder eccentrically mounted, the operating-shaft, the rock-shaft connected to said cylinder and means for tripping the same, of the clutch-pulley having an operating member, the sliding collar designed to engage said operating member, the shaft having a forked end engaging said collar, the spring acting on said shaft, the lock for the latter, and the arm carried by said rock-shaft for engaging said lock, substantially as set forth.

23. The combination with a press having its impression-cylinder eccentrically mounted, the operating-shaft, the spring-impelled rock-shaft, and means for tripping the same, of the clutch-pulley, the sliding collar engaging an arm of said pulley, the spring-impelled shaft engaging said collar at one end, and having a handle-bar on the other end provided with a shoulder, a pivoted locking-arm engaging said shoulder, and an arm on said rock-shaft designed to engage said locking-arm, substantially as set forth.

24. The combination with a press, of an ink-trough, a roller located over the outlet thereof having a ratchet-wheel, a sleeve loose on said roller, and carrying a pawl engaging said ratchet-wheel, means for reciprocally actuating said sleeve, a rock-shaft supporting a second roller, and an arm on said rock-shaft having a spring-held tongue designed to be engaged by said sleeve for rocking said shaft, substantially as set forth.

25. In a printing-press, the combination with the ink-trough, a fountain-roller, a sleeve on said roller having a shoulder, an operating-arm extending from said sleeve, and means for reciprocally operating said sleeve connected to said arm, of a rock-shaft, a roller supported thereby, an arm on said rock-shaft having a recessed end, and a spring-held tongue fitted in said recess, designed to be engaged by said shoulder, as and for the purpose set forth.

26. In a printing-press, the combination with the frame, having an inner projection, and the impression-cylinder having a groove, of the spring-held shaft mounted in said groove having an arm designed to engage said projection, the plate on said shaft extending over said groove, and the stops adjustable on said plate, substantially as set forth.

27. The combination with a printing-press, throw-off mechanism for the impression-cylinder, and a trip for normally holding said throw-off mechanism, of a rock-shaft located in rear of said impression-cylinder, and tapered arms mounted thereon normally held away from said cylinder and designed to be thrown against or near the periphery thereof, said rock-shaft being operated in the event of said throw-off mechanism being freed by said trip, as set forth.

28. The combination with a printing-press, stop mechanism and means for operating the same, of a rock-shaft and tapered arms mounted thereon designed to be thrown against or near the periphery of the impression-cylinder when said stop mechanism is operated, said rock-shaft being connected to the said operating means, substantially as set forth.

29. The combination with a printing-press having throw-off mechanism for the impression-cylinder, of a two-chambered receptacle, tapered blocks having their edges against or near said cylinder for directing the discharge therefrom into one of said chambers, a rock-shaft connected to said throw-off mechanism, and tapered arms on said rock-shaft for directing the discharge into the other one of said chambers, substantially as set forth.

30. The combination with a printing-press having a rotary impression-cylinder, of a rotary discharge-receiving receptacle having two concentric chambers, means for gradually rotating the same, and means for directing the discharge into either one of the chambers of said receptacle, as set forth.

31. The combination with a printing-press having a rotary impression-cylinder, of a rotary discharge-receiving receptacle having two concentric chambers, blocks having their edges against or near said cylinder for directing the discharge therefrom into one of said chambers, tapered arms, and means for throwing the same against or near said cylinder for directing the discharge into the other one of said chambers, substantially as set forth.

32. The combination with a printing-press having a feed-table, of a reciprocating feeder movable longitudinally over said table, a plate at the forward end of said feeder having an inclined portion and a shoulder at the upper end of said incline, and an adjustable plate having its free end abutting against said shoulder, as set forth.

33. The combination with a printing-press having a feed-table, of a reciprocating feeder movable longitudinally over said table, a plate at the forward end of said feeder having an inclined portion and a shoulder at the upper end of said incline, a longitudinally-adjustable plate having a slot, and a screw extending through said slot for binding said latter plate to said former plate, substantially as set forth.

34. The combination with a printing-press having a feed-table, of a reciprocating feeder comprising a rod, a plate pivotally mounted on the free end of said rod, inclined extensions having shoulders at their upper ends, and adjustable plates having their forward ends abutting against said shoulders, substantially as set forth.

35. The combination with a printing-press having a feed-table, of a reciprocating feeder comprising a rod, a plate pivotally mounted on the free end of said rod, inclined plates extending from said former plate having upper shoulders and adjustable plates secured to said inclined plates and having their free ends abutting against said shoulders, substantially as set forth.

36. The combination with a printing-press having a feed-table, of a reciprocating rod, a transverse pin extending therefrom, a plate pivoted on said rod and designed to engage said transverse pin, inclined plates extending from said former plate, and adjustable plates secured to said inclined plates, as and for the purpose set forth.

37. The combination with a printing-press having a feed-table provided with upper guide-plates, of a slide fitted between said guide-plates, a rocking shaft connected with the press having an arm engaging said slide, a rod connected to said slide, a plate on the forward end of said rod having inclined shouldered plates, and plates having their ends adjacent to said shoulders, as and for the purpose set forth.

38. The combination with a printing-press having a feed-table and a feeder, of a post, a slide adjustably mounted in said post, an arm projecting from said slide, a plate pivoted at one end to the lower end of said arm and having a flat portion and at its other end designed to engage said slide, said arm and slide limiting the movements of the free end of said plate, as set forth.

39. The combination with a printing-press having a feed-table and a feeder, of the post having a recess in its front face, a slide fitted in said recess having a slot, a screw-rod vertically adjustable in said post having a flange fitting in said slot, an arm extending from said slide, a plate pivoted to said arm and having its forward bent end bearing against said slide, and a spring acting on said plate, substantially as set forth.

In testimony whereof we have signed this specification in the presence of two subscribing witnesses.

CHARLES G. HARRIS.
JOHN F. McNUTT.

Witnesses:
A. F. HARRIS,
GEO. W. UPTON.